Aug. 13, 1963   J. NAAB   3,100,516
THREADED MEMBERS LOCKED BY EXPANDED TUBULAR LOCKING PIN
Filed Feb. 6, 1959

INVENTOR
JULIUS NAAB
BY
HIS ATTORNEY

3,100,516
THREADED MEMBERS LOCKED BY EXPANDED TUBULAR LOCKING PIN
Julius Naab, Easton, Pa., assignor to Ingersoll-Rand Company, New York, N.Y., a corporation of New Jersey
Filed Feb. 6, 1959, Ser. No. 791,755
2 Claims. (Cl. 151—8)

This invention relates generally to locking devices, and more particularly to those applied to plugs in holes in a wall of a member, such as the plugs in the core holes of hollow castings.

When a hollow member, for example a hollow piston, is cast, the opening to remove the mold of the interior of the piston is plugged, and the plug is then secured against rotation to prevent the plug from working loose from the opening. However, as is generally known, it occurs at times that the plug works loose, due to the effects of, such as, temperature changes and flexing of the piston faces. This working loose of the plug is obviously objectionable and, the provision of a device to prevent such working loose of the plug would be of paramount importance.

It is then the primary object of this invention to provide a locking device for a plug in the hole in a wall of a member to secure the plug against working loose.

Another object of this invention is to provide a locking device that is simple, efficient and reliable.

These and other objects and advantages of the present invention will more fully appear from the following description made in connection with the accompanying drawings in which.

Figure 1:
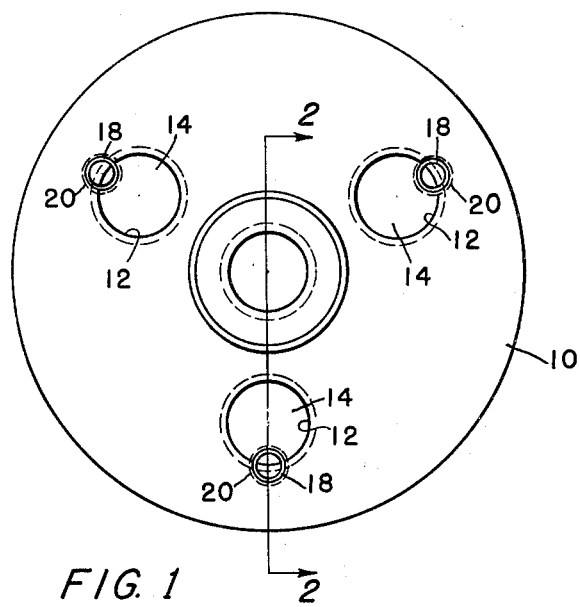
FIGURE 1 is a top view of a piston.

Referring now more particularly to FIG. 1, a preferred embodiment of this invention, 10 designates a piston, a commonly known type hollow piston, having openings 12 which have been used to release the mold of the interior of the piston.

Figure 2:
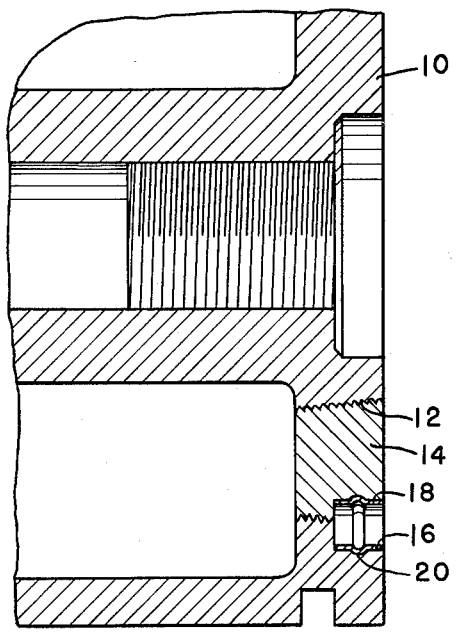
FIG. 2 is an enlarged cross sectional view of a part of the piston shown in FIG. 1, taken along the line 2—2 of FIG. 1 and looking in the direction of the arrows.

As shown in FIG. 2 each opening 12 is plugged by a threaded plug 14, and the plug being locked against rotation or working loose from the opening 12.

Figure 3:
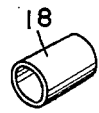
FIG. 3 shows a tube that is used as a means to form the locking device according to the present invention.

The locking device, according to this invention, comprises a hole 16, in which a tube 18, as shown in FIG. 3, is inserted. It is to be noted that the hole 16 is drilled partly in the material of the piston 10 and partly in the material of the plug 14. A circumferential groove 20 is provided in the wall of the hole 16, and, after the tube 18 has been inserted in the hole 16, a portion of the tube 18 is expanded in the groove 20, such, that the tube 18 is held in the hole 16, and, consequently, preventing the plug 14 from rotating or working loose from the opening 12.

In order to expand the tube 18 in the hole 16 so that the groove 20 will receive the expanded portion of the tube 18, a resilient plug such as rubber is inserted in the tube 18, and a piece of stock steel, the outside diameter of which is equal to or slightly less than the inside diameter of the tube 18, is also inserted in the tube. When a hammer or similar device strikes the piece of stock steel the rubber is compressed longitudinally and will attempt to expand laterally against the walls of the tube 18, thereby applying pressure in a radial direction to the walls of tube 18. The only portion of the tube 18 which may expand is that portion which is in alignment with the grooves 20. When the tube 18 is thus expanded the piece of stock steel is removed, thereby allowing the resilient plug to resume its original shape so that it also may be removed.

It should be understood that the description and drawings herein are illustrative only, and that various changes and modifications may be made in the structure disclosed without departing from the spirit of the invention.

I claim:

1. In combination with a member having a threaded opening and a plug disposed in the opening threadedly engaging said member, locking means comprising a wall defining a cylindrical opening partly in said member and partly in said plug, said wall having an annular groove partly in said plug and partly in said member, and a thin walled tube disposed in said cylindrical opening having an annular portion intermediate its ends radially expanded into said annular groove for fixing said tube in said cylindrical opening thereby locking said plug in said member.

2. In combination with a member having a threaded opening and a plug disposed in the opening threadedly engaging said member, locking means comprising a wall defining a cylindrical opening closed at one end, said cylindrical opening being partly in said member and partly in said plug, said wall having an annular groove partly in said member and partly in said plug spaced from said closed end, and a thin walled tube disposed in said cylindrical opening having an annular portion intermediate its ends radially expanded into said annular groove for fixing said tube in said cylindrical opening thereby locking sadi plug in said member.

References Cited in the file of this patent

UNITED STATES PATENTS

| 564,289 | Maloney | July 21, 1896 |
| 858,549 | West et al. | July 2, 1907 |
| 883,691 | Bowman | Apr. 7, 1908 |
| 1,814,858 | Rutter | July 14, 1931 |
| 2,203,219 | Jackman | June 4, 1940 |

FOREIGN PATENTS

| 267,495 | Great Britain | Apr. 7, 1927 |
| 558,500 | Great Britain | Jan. 7, 1944 |